United States Patent
Luo et al.

(10) Patent No.: US 9,961,334 B2
(45) Date of Patent: May 1, 2018

(54) SIMULATED 3D IMAGE DISPLAY METHOD AND DISPLAY DEVICE

(71) Applicant: SuperD Co. Ltd., Shenzhen (CN)

(72) Inventors: Yanqing Luo, Shenzhen (CN); Peiyun Jian, Shenzhen (CN); Ning Liu, Shenzhen (CN)

(73) Assignee: SuperD Co. Ltd., Shenzhen (CN)

(*) Notice: Subject to any disclaimer, the term of this patent is extended or adjusted under 35 U.S.C. 154(b) by 248 days.

(21) Appl. No.: 14/918,162

(22) Filed: Oct. 20, 2015

(65) Prior Publication Data

US 2016/0150222 A1    May 26, 2016

(30) Foreign Application Priority Data

Nov. 25, 2014   (CN) .......................... 2014-10690154

(51) Int. Cl.
  *H04N 13/04* (2006.01)
  *H04N 13/00* (2018.01)
  *G06F 3/0481* (2013.01)
  *G09G 3/00* (2006.01)
  *G06T 15/20* (2011.01)

(52) U.S. Cl.
  CPC ....... *H04N 13/047* (2013.01); *G06F 3/04815* (2013.01); *G06T 15/20* (2013.01); *G09G 3/003* (2013.01); *H04N 13/0022* (2013.01); *H04N 13/0037* (2013.01); *G06T 2215/16* (2013.01); *G09G 2320/0261* (2013.01); *G09G 2354/00* (2013.01)

(58) Field of Classification Search
  CPC .......................... H04N 13/047; G06F 3/04815
  USPC ....................................................... 348/143
  See application file for complete search history.

(56) References Cited

U.S. PATENT DOCUMENTS

2009/0271732 A1* 10/2009 Kondo ............... G02B 27/0093
                                                           715/781
2013/0187910 A1*  7/2013 Raymond ............... G09G 5/14
                                                           345/419
2015/0341616 A1* 11/2015 Siegel .................. H04N 13/026
                                                            348/54

FOREIGN PATENT DOCUMENTS

| CN | 101739567 A  | 6/2010 |
| CN | 101931823 A  | 12/2010 |
| CN | 103119628 A  | 5/2013 |
| CN | 103337095 A  | 10/2013 |
| JP | 2003117144 A | 4/2003 |
| TW | 200933491 A  | 8/2009 |

(Continued)

OTHER PUBLICATIONS

The State Intellectual Property Office of the People's Republic of China (SIPO) Office Action 1 for 201410690154.8 dated Dec. 28, 2015.

*Primary Examiner* — Farzana Hossain
(74) *Attorney, Agent, or Firm* — Anova Law Group, PLLC

(57) ABSTRACT

A simulated 3D image display method is provided for a display device. The method includes capturing at least two images of a scene for 3D scene reconstruction; extracting depth and color information from the at least two images of the scene for 3D scene reconstruction; continuously tracking movement of a user to determine a relative position between the user and the display device; and, based on the relative position, reconstructing the image of the scene corresponding to a current viewpoint of the user from a plurality of view images of a plurality of viewpoints generated based on the at least two images and using an interpolation algorithm for display on a display screen of the display device.

19 Claims, 4 Drawing Sheets

(56) References Cited

FOREIGN PATENT DOCUMENTS

TW 201349174 A 12/2013
TW 201528776 A 7/2015

* cited by examiner

SIMULATED 3D IMAGE DISPLAY METHOD AND DISPLAY DEVICE

CROSS-REFERENCES TO RELATED APPLICATIONS

This application claims the priority of Chinese patent application No. CN201410690154.8, filed on Nov. 25, 2014, the entire content of which is incorporated herein by reference.

FIELD OF THE DISCLOSURE

The present disclosure generally relates to the field of display technologies and, more particularly, relates to a simulated 3D image display method and a display device.

BACKGROUND

Most conventional three-dimensional image (3D) display technologies achieve displaying 3D images through 3D display devices having a combination of optical lenses and display panels. However, such 3D image display devices are more expensive. It is desirable to provide users with a 3D viewing experience by displaying 3D images on conventional two-dimensional (2D) display devices.

Current technologies for displaying 3D images on a 2D display device can involve motion parallax to provide user with content images corresponding to changing viewpoints to simulate the 3D viewing experience. However, current technologies often do not involve how to use interpolation to generate images corresponding to user's locations.

The disclosed 3D image display methods and display devices are directed to solve one or more problems set forth above and other problems in the art.

BRIEF SUMMARY OF THE DISCLOSURE

Directed to solve one or more problems set forth above and other problems in the art, the present disclosure provides a simulated 3D image display method and a display device to give user 3D image viewing experience on 2D display device.

One aspect of the present disclosure includes a simulated 3D image display method for a display device. The method includes capturing at least two images of a scene for 3D scene reconstruction; extracting depth and color information from the at least two images of the scene for 3D scene reconstruction; continuously tracking movement of a user to determine a relative position between the user and the display device; and, based on the relative position, reconstructing the image of the scene corresponding to a current viewpoint of the user from a plurality of view images of a plurality of viewpoints generated based on the at least two images and using an interpolation algorithm for display on a display screen of the display device.

Another aspect of the present disclosure includes a display device. The display device includes an image capture unit, a scene information extraction unit, a relative position tracking unit, and a display image reconstruction unit. The image capture unit is configured to capture at least two images of a scene for 3D scene reconstruction. The scene information extraction unit is configured to extract depth and color information of the scene for 3D scene reconstruction based on the at least two images of the scene captured by the image capture unit. The relative position tracking unit is configured to continuously track movement of a user to determine a relative position between the user and the display device. Further, the display image reconstruction unit is configured to, based on the relative position, reconstructing the image of the scene corresponding to a current viewpoint of the user from a plurality of view images of a plurality of viewpoints generated based on the at least two images and using an interpolation algorithm for display on a display screen of the display device.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the invention.

Figure 1:
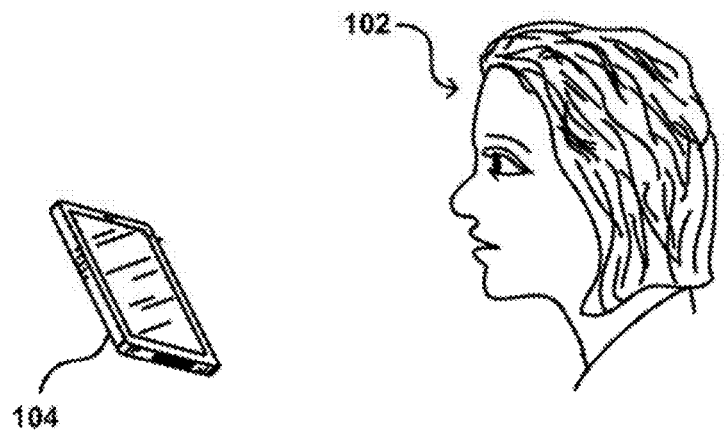
FIG. 1 illustrates a usage scenario of a simulated 3D image display method according to the disclosed embodiments.

FIG. 1 illustrates a usage scenario of a simulated 3D image display method according to the present disclosure. As shown in FIG. 1, a user 102 is a viewer of a display device 104, and the user 102 is within a viewing range of the display device 104. The user 102 may move around the display device 104.

The display device 104 may be a mobile phone, a tablet computer, a laptop computer, an all-in-one computer, a flat panel television set, or any other electronic device with display. In most cases, the display device 104 does not support 3D image display. In other cases, the display device 104 may support 3D image display, but does not operate in 3D display mode. When the simulated 3D image display method according to the present disclosure is applied, the user 102 may be able to see different images on the display device 104 corresponding to the changing locations of the user 102 to perceive the 3D viewing experience.

The display device 104 may include a display screen and a processor, as well as a tracking device connected to the processor/the display device 104. The tracking device may be an independent image acquisition device or an accessory integrated with the display device 104. For example, the tracking device may include an infrared transmitter coupled with an infrared receiver to detect the user's position relative to the display device 104. The display device 104 may use the processor to calculate the relative position between the user 102 and the display device 104. The relative position may include, but is not limited to, direction, angle, distance, and etc.

Depending on the dimensions and characteristics of the display device 104, the display device 104 may detect the change of the relative position due to the position change of the display device 104 or the user 102 or both. Regardless of which one changes the position, the processor coupled with the tracking device may be able to calculate and determine the relative position between the display device 104 and the user 102.

To achieve the 3D viewing on displays that do not support 3D image display or are not operated in 3D display mode, the present disclosure provides a motion parallax based 3D image display method. When the user 102 views the display device 104 from different viewpoints, the user 102 may see a series of different images of the same scene corresponding to the different viewpoints when the relative position between the user 102 and the display device 104 changes. Because these images are view images obtained under different viewpoints for the same scene, the user 102 can perceive a 3D scene.

Accordingly, the disclosed method may include certain steps, including scene capturing, relative position tracking, and scene reconstruction. In the scene capturing step, 3D information of the scene is captured. In the relative position tracking step, the relative position between the user 102 and the display device 104 is dynamically tracked and calculated in real-time to determine the current viewpoint of the user 102. In the scene reconstruction step, the display image of the scene is reconstructed based on the relative position between the user 102 and the display device 104. Thus, the user 102 may perceive the 3D viewing experience on displays that do not support 3D display or are not operated in 3D display mode.

Figure 2:
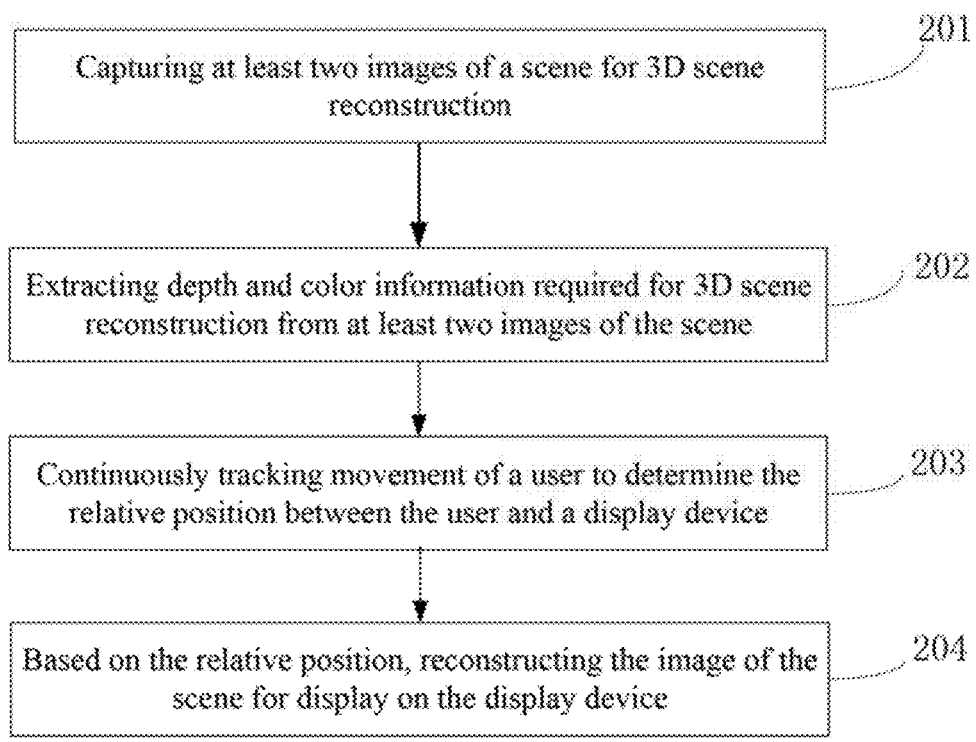
FIG. 2 illustrates a flow chart of an exemplary simulated 3D image display method according to the disclosed embodiments.

Based on the application scenario described above, the present disclosure provides a simulated 3D image display method. FIG. 2 illustrates a flow chart of an exemplary simulated 3D image display method according to the present disclosure. The method may be incorporated into the display device 104 shown in FIG. 1. The method may include the following steps.

Step S201: capturing at least two images of the scene for 3D image reconstruction.

In this step, a camera may be used to capture at least two images of the target object from different viewpoints for 3D image reconstruction. Alternatively, the two images required for 3D image reconstruction may be two I-frames obtained from the video file capturing the target object. Preferably, when more images are captured, the images may be captured from evenly distributed viewpoints.

Step S202: extracting depth and color information from at least two captured images for 3D scene reconstruction.

In this step, the display device may use an existing local algorithm or a global algorithm to process the two captured images of the scene from different viewpoints to extract the depth and color information required for 3D scene reconstruction. For example, bundle adjustment algorithm may be used to calculate the depth information for each pixel of the 3D scene represented by at least two captured images from different viewpoints. The depth and color information for each pixel of the 3D scene may be represented and recorded in a RGBD format.

Step S203: continuously tracking movement of the user to determine the relative position between the user and the display device.

In this step, an infrared lamp coupled with an infrared detector or image acquisition camera may be used to determine the relative position between the user and the display device. The relative position information calculated by the display device may include the relative position between a stationary user and a moving display device (i.e., the user is in a stationary state and the display device is in a moving state), the relative position between a moving user and a stationary display device (i.e., the user is in a moving state and the display device is in a stationary state), or the relative position between a moving user and a moving display device (i.e., the user is in a moving state and the display device is in a moving state).

Step S204: based on relative position, determining the images of the 3D scene corresponding to the current user position and displaying the determined images on the display screen to achieve reconstructing the 3D scene.

In this step, the display device combines the 3D scene information required for image reconstruction and the relative position between the user and the display device to generate the image of the 3D scene for each position, and the images are displayed on the display screen of the display device. Because the user is moving relative to the display device, the user is able to see the image of the 3D scene corresponding to each viewpoint. The varying images of the 3D scene of different viewpoints may reconstruct the 3D scene as perspective of the brain of the user. Thus, the 3D viewing experience is achieved.

The steps S201-S202 are intended to prepare for 3D scene reconstruction. In order for the user to see the images of the 3D scene from different viewpoints, images of different viewpoints are captured. For a same scene to have different images or view images from different viewpoints, the present disclosure provides the method of reconstructing the 3D scene from the pre-captured images from different viewpoints. The 3D information of the reconstructed 3D scene may be extracted and stored. The result of the 3D scene capturing may be presented by adding the depth information to each pixel. With the depth information, the images of the 3D scene from the viewpoints where no image was captured in the 3D scene capture step may be reconstructed. Thus, adding the depth information is essential for 3D scene representation.

In one embodiment, the depth information of a 3D image may be represented in RGBD format. For each pixel, the values of RGB represent the color information and the value of D represents the depth information. The pixel position relationship may be the relative position difference between the pixels. Because human brain is able to form 3D perception when presented with different images from different viewpoints, a plurality of images of the same 3D scene corresponding to different viewpoints may be used to represent the 3D scene capture result. In one embodiment, the 3D scene capture may be achieved by obtaining a plurality of images of the same 3D scene corresponding to different viewpoints and applying the parallax constraint and depth constraint to the captured images.

In the step S201, a plurality of cameras may be used to capture the images of the scene from different viewpoints required for 3D scene reconstruction. Alternatively, a single camera may be moved to capture the images of the scene from different viewpoints. Depending on the capturing method, a plurality of images or video I-frames may be used to reconstruct the scene.

Figure 3:
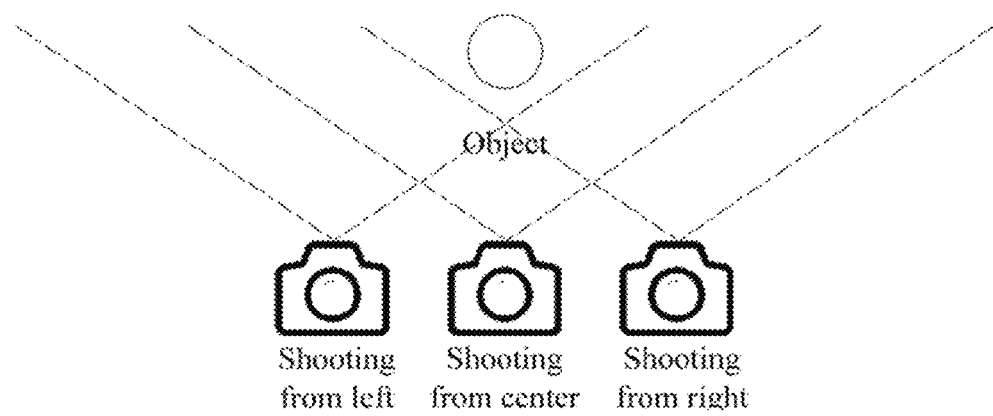
FIG. 3 illustrates a schematic view of obtaining images required for 3D scene reconstruction in an exemplary simulated 3D image display method according to the disclosed embodiments.
Figure 4:
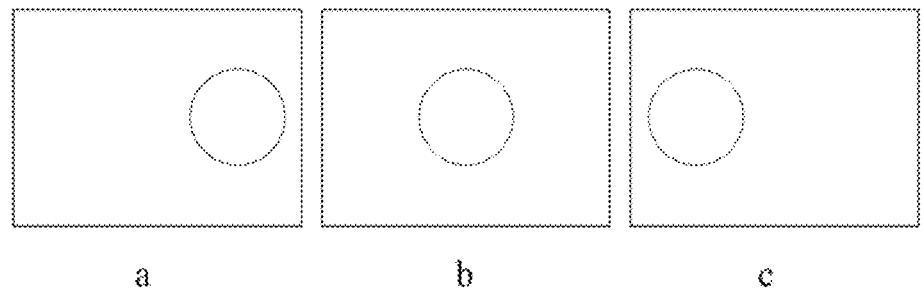
FIG. 4 illustrates the images obtained for 3D scene reconstruction according to the exemplary embodiments as shown in FIG. 3.

As shown in FIG. 3, when a single camera is used to capture the images of the scene, the movement of the camera is equivalent to the movement of the viewpoint. When moved horizontally, the camera may be able to capture a panorama view of the scene. When moved by rotating around the scene, the camera may be able to capture the same scene from different viewing angles. FIG. 3 illustrates a schematic view of obtaining images required for 3D scene reconstruction when the camera is moved horizontally. The scene to be captured is a circular object. The same camera is moved horizontally to capture the images. The camera shown in FIG. 3 shoots at the left, the middle and the right side positions. The viewing angle of the camera is bounded by the dashed lines. The camera shown in FIG. 3 may capture the images shown in FIG. 4. The three images shown in FIG. 4 may be captured when the camera is moved horizontally from left to right. The image a shows the circular object on the right of the image. The image b shows the circular object at the center of the image. The image c shows the circular object on the left of the image.

Figure 5:
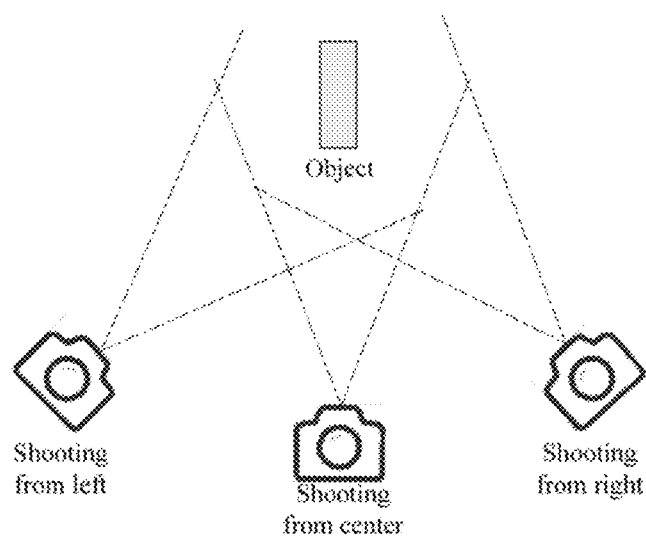
FIG. 5 illustrates a schematic view of obtaining images required for 3D scene reconstruction in another exemplary simulated 3D image display method according to the disclosed embodiments.
Figure 6:
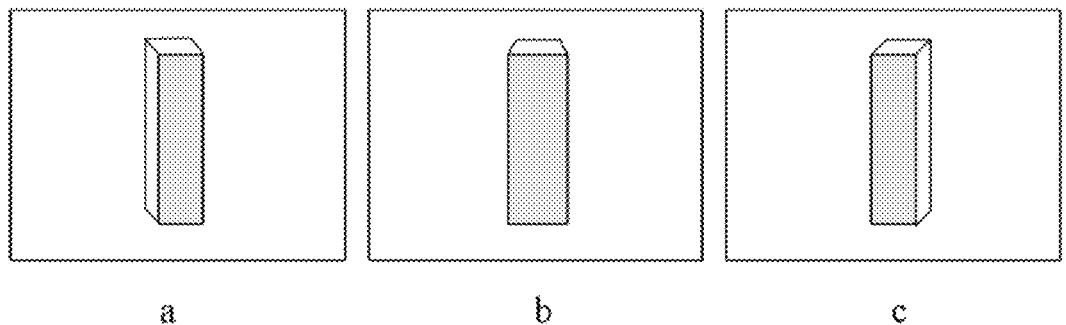
FIG. 6 illustrates the images obtained for 3D scene reconstruction according to the exemplary embodiments as shown in FIG. 5.

FIG. 5 illustrates a schematic view of obtaining images required for 3D scene reconstruction when the camera is moved by rotating around the scene. As shown in FIG. 5, the scene to be captured is a rectangular object. The same camera is moved by rotating around the rectangular object to capture the images. The camera shown in FIG. 5 shoots at the left side, the middle and the right side positions. The viewing angle of the camera is bounded by the dashed lines. The camera shown in FIG. 5 may capture the images shown in FIG. 6. The three images a, b and c shown in FIG. 6 may be captured when the camera is moved by rotating counter-clockwise around the rectangular object. The different images of the same object are captured from different viewpoints.

After the images of the scene are captured, the display device may extract the depth and color information of the 3D scene and store the information in RGBD format. In the meantime, the display device may apply parallax constraint and depth constraint to at least two images of different viewpoints.

In the step S204, the relative position of the user is required to determine the image of the 3D scene to display on the display device for the user to view at the current viewpoint. When the viewpoint of the user changes, the display image may be updated for the user to view at the changed viewpoint. For example, the relative position relationship between the user and the display device obtained in the step S203 may be used to determine the image corresponding to the viewpoint of the user. The relative position between the user and the display device may include the viewing angle of the user. Different scene reconstruction methods may be different in determining the image corresponding to the viewpoint of the user.

In one embodiment, the display device may include a processor that divides the viewing range of the display device into N sections. N may be the number of the images or video I-frames of the 3D scene. Each image or video I-frame may correspond to one of the N sections. Then, the display device may match the relative position between the user and the display device with one of the N sections.

In the meantime, the depth and color information of the 3D scene may be used to generate N number of images of the 3D scene corresponding to N number of sections. Then, the generated image in the section corresponding to the relative position between the user and the display device may be retrieved as the image of the 3D scene from the viewpoint of the user for display on the display device.

Specifically, when a plurality of images or video I-frames is captured for 3D scene reconstruction, the display device may divide the viewing range into n sections. n may be the number of images or video I-frames of the 3D scene. The bigger the number n is, the more viewpoints or sections the reconstructed scene may have. The sections in the viewing range may be associated with the images of the scene from different viewpoints accordingly. Depending on the section where the user is present, the corresponding image may be displayed.

For example, the display device may have five video I-frames stored. The five I-frames may be labeled from 1 to 5 according to the sequence they are captured by the camera. The display device may have a viewing range of about 0-180 degrees. Then the viewing range may be divided into five sections. Each section may include about 36 degrees of the viewing range. The five sections may be presented as [0, 36], (36, 72], (72, 108], (108, 144], (144, 180], where '(' refers to non-inclusive and ']' refers to inclusive. When the user is present in the section [0, 36], I-frame 1 may be displayed. When the user is present in the section [0, 36], I-frame 1 may be displayed. When the user is present in the section (36, 72], I-frame 2 may be displayed. When the user is present in the section (72, 108], I-frame 3 may be displayed. When the user is present in the section (108, 144], I-frame 4 may be displayed. When the user is present in the section (144, 180], I-frame 5 may be displayed.

In another embodiment, the display device may use the relative position and at least two images of the scene captured from different viewpoints to generate the image of the scene corresponding to the relative position. For example, two images may be called left image and right image according to the shooting angles. When an interpolation method is used to reconstruct the scene, the relative position between the user and the display device may be used to generate the image of the scene corresponding to the viewpoint of the user. For example, the viewpoint of the user is represented as θ. The left image corresponds to the image of the scene from the viewpoint θ=60°. The right image corresponds to the image of the scene from the viewpoint θ=120°. The images of the scene from other viewpoints may be generated for display according to the following method.

When the user is tracked to be present in the viewpoint range of 0°<θ<60°, the equation (1) below may be used to generate the corresponding display image.

$$Q + kD' = Q' \quad (1)$$

Wherein, Q is the relative position of a pixel in the left image, Q' is the relative position of the same pixel in the reconstructed image corresponding to the viewpoint of the user, D' is the parallax value at the relative position Q in the parallax image produced from the left image and the right image, and k is defined in the equation (2) below.

$$k = 1 - \theta/60 \quad (2)$$

The image of the 3D scene corresponding to the relative position between the user and the display device may be generated by following the method described herein.

When the user is tracked to be present in the viewpoint range of 60°≤θ<120°, the equation (3) below may be used to generate the corresponding display image.

$$-kD'_L p_1 + (1-k)D'_R p_2 = p' \quad (3)$$

Where $p_1$ is the column coordinate of a pixel in the left image, $p_2$ is the column coordinate of the same pixel in the right image, p' is the column coordinate of the same pixel in the reconstructed image, the corresponding row coordinates to $p_1$, $p_2$' and p' are the same, $D'_L$ is the parallax value in the parallax image produced with reference to the left image, $D'_R$ is the parallax value in the parallax image produced with reference to the right image, and k is defined in the equation (4) below.

$$k = (\theta - 90)/60 \quad (4)$$

When the user is tracked to be present in the viewpoint range of 120°≤θ<180°, the equation (5) below, similar to the equation for the viewpoint range of 0°<θ<60°, may be used to generate the corresponding display image.

$$F + kD' = F' \quad (5)$$

Where F is the relative position of a pixel in the right image, F' is the relative position of the same pixel in the first image that is reconstructed and inserted to the right of the right image, D' is the parallax value at the relative position F in the parallax image produced from the left image and the right image, and k is defined in the equation (6) below.

$$k = (\theta - 120)/60 \quad (6)$$

The methods described above may be used to interpolate and generate the image of the 3D scene corresponding to the current viewpoint of the user. The reconstructed image may be displayed on the display device for the user to view at the specific viewpoint.

In certain embodiments, at least two images may be captured to determine the depth and color information for the 3D scene reconstruction. Through tracking the movement of the user, the relative position between the user and the display device may be obtained. The relative position may be used to reconstruct the image of the 3D scene corresponding to the viewpoint of the user for display on the display device. The method of reconstruction through interpolation provides the user 3D viewing experience on the display device that only supports 2D display or is not operated in the 3D display mode.

Figure 7:
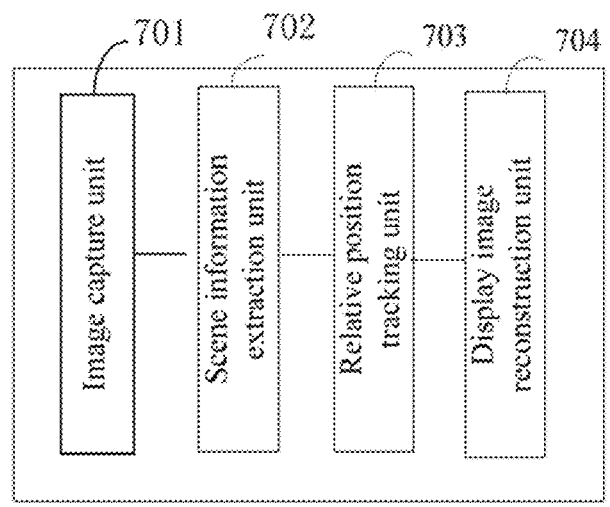
FIG. 7 illustrates a block diagram of an exemplary display device according to the disclosed embodiments.

Accordingly, the present disclosure provides a display device as shown in FIG. 7. The display device may be the display device 104 as shown in FIG. 1. In certain embodiments, for example, the display device may be a tablet computer, a cell phone, a flat panel television set, or any other electronic device with display. Such display devices may be display devices that only support 2D display or are not operated in 3D display mode.

The display device according to the present disclosure may include an image capture unit 701, a scene information extraction unit 702, a relative position tracking unit 703, and a display image reconstruction or determination/reconstruction unit 704. Other units may also be included.

The image capture unit 701 may be configured to capture at least two images of the scene for 3D reconstruction. The scene information extraction unit 702 may be configured to extract the depth and color information from at least two captured images of the scene required for 3D reconstruction. Further, the relative position tracking unit 703 may be configured to continuously track the movement of the user to determine the relative position between the user and the display device. The display image reconstruction unit 704 may be configured to use the relative position information to determine or reconstruct the image of the 3D scene corresponding to the current viewpoint of the user for display on the display device.

In certain embodiments, the relative position between the user and the display device may further include the relative position when the user is stationary and the display device is moving or when the user is moving and the display device is stationary or when both the user and the display device are moving. Regardless of what causes the change of the relative position, the relative position tracking unit 703 may be able to track and determine the relative position between the user and the display device.

In certain other embodiments, the image capture unit 701 may use a camera to capture at least two images of the target scene or object from different viewpoints for 3D scene reconstruction. Alternatively, at least two I-frames obtained from the captured video of the scene may be the images used for the scene information extraction. Depending on how the original images are captured, different ways of 3D scene reconstruction may be applied.

In one embodiment, the display device may further include a scene information representation unit (not shown), configured to represent the depth and color information of the 3D scene in RGBD format. The scene information representation unit may operate after the scene information extraction unit 702 extracts the depth and color information required for the 3D scene reconstruction.

In order to achieve desired effect of 3D scene reconstruction, the display device may further include a constraint enforcement unit (not shown), configured to apply parallax constraint and depth constraint to at least two images required for 3D scene reconstruction when the 3D scene information is represented in RBGD format.

The display device may further include a section division unit (not shown) and a section matching unit (not shown). The section division unit may divide the viewpoint range of the display device into N sections. N may be the number of the images of the scene or the number of the video I-frames. Each image or I-frame corresponds to one of the N sections. The section matching unit may be configured to match the relative position between the user and the display device with one of the N sections and subsequently with one of the images or video I-frames. The matching image or I-frame may be displayed on the display device.

The display image determination/reconstruction unit 704 may further include an image generation sub-unit (not shown). The image generation sub-unit may be configured to generate the N number of images of the 3D scene corresponding to the N sections based on the extracted depth and color information of the 3D scene, and an image display sub-unit, configured to display on the display device the image of the 3D scene for the section corresponding to the relative position between the user and the display device.

In another embodiment, the display device may further include an image interpolation unit (not shown). The image interpolation unit may be configured to generate the image of the scene corresponding to the relative position based on the relative position and at least two captured images of the 3D scene. For example, the image interpolation unit may use interpolation algorithm, coupled with the parallax values and pixel coordinates, to generate corresponding images. More detailed descriptions may refer to above described methods.

Thus, the display device according to the present disclosure can provide the user with 3D viewing experience on the display device that only supports 2D display or is not operated in 3D display mode.

Figure 8:
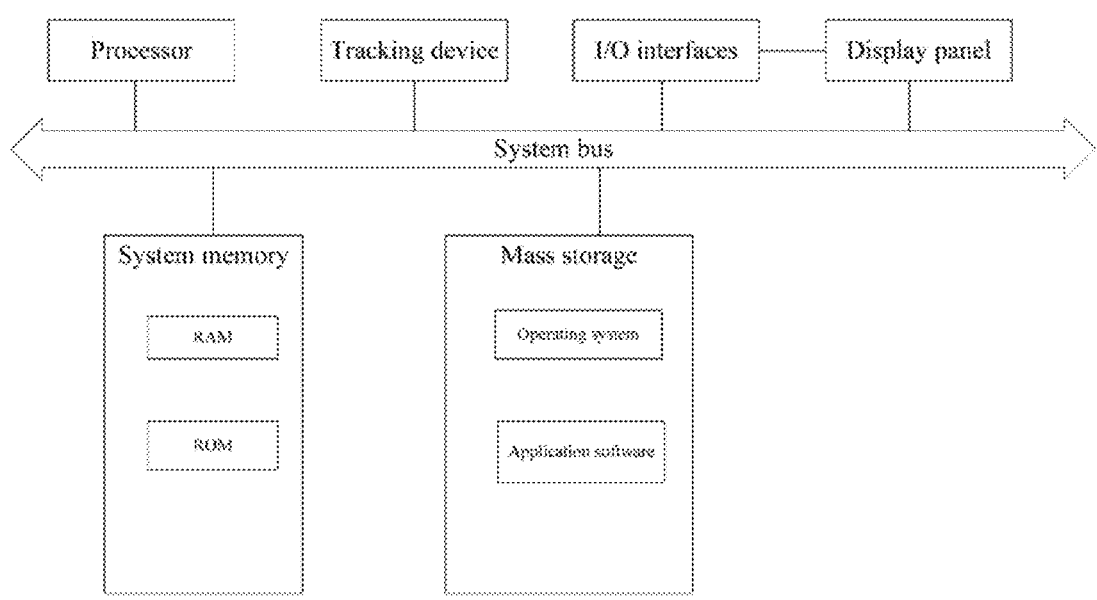
FIG. 8 illustrates a block diagram of another exemplary display device according to the disclosed embodiments.

Further, the present disclosure also provides a display device as shown in FIG. 8. The display device may be the display device 104 as shown in FIG. 1. For example, the display device may be a tablet computer, a cell phone, a flat panel television set or any other electronic device with display. Such display devices usually do not support 3D display or do not operate in 3D display mode. As shown in FIG. 8, the display device may be a computer system that includes a processor, a tracking device, I/O interfaces, a display panel, system memory, mass storage, and a system bus that connects the tracking device, the I/O interfaces, the display panel, the system memory, and the mass storage to the processor.

As shown in FIG. 8, the memory storage part of the display device may include the system memory and the mass storage. The system memory may further include ROM and RAM. The basic input and output system software may be stored in ROM. The operating system software, application software, data, and various other software programs and modules may be stored in mass storage.

The mass storage may connect to the processor through a mass storage controller (not shown) connected to the system bus. The mass storage and other related computer readable media may provide the non-volatile storage for the computer system.

The computer readable media may include hard drive or CD-ROM drive, etc. However it should be understood by those skilled in the art that the computer readable media may include any computer storage media that can be accessed by the computer system.

The computer readable media may include, but is not limited to, any volatile or non-volatile media with or without moving parts for the purpose of storing computer readable instructions, data structures, program modules, or any other data. For example, the computer readable media may include, but is not limited to, RAM, ROM, EPROM, EEPROM, flash memory or other solid state memory, CD-ROM, DVD, HD-DVD, blue ray, other optical storage, cassette tape, storage tape, hard drive, other magnetic storage, or any other media that store information and allow the computer system to retrieve the stored information.

The computer system may connect to a communication network through the network interface element connected to the system bus. The computer system may also include the I/O interface controller (not shown) to receive and process the input data from various input equipment such as keyboard, mouse, and electronic stylus, etc. Similarly, the I/O interface controller may transmit output data to various output equipment such as display panel, and printer, etc. The display panel may connect to the system bus through a graphics adapter or a graphics processing unit (not shown).

In one embodiment, the display device may include a tracking device, such as a camera, configured to capture images of the user in real-time and to allow the processor to analyze the face of the user for position information extraction.

As briefly described above, a plurality of program modules and data files, for example, the operating system for controlling the operation of the display panel, may be stored in the system memory such as RAM and the mass storage of the computer system. The mass storage, ROM, and RAM may store one or more program modules. Specifically, the mass storage, ROM, and RAM may store application programs executed by the processor.

The computer system of the display device may store a specific group of software program code that may be executed by the processor to perform the following operations: capturing at least two image of the scene for 3D scene reconstruction, extracting the depth and color information required for 3D scene reconstruction based on at least two captured images, continuously tracking the movement of the user to determine the relative position between the user and the display device, and based on the relative position, reconstructing the image of the 3D scene corresponding to the current viewpoint of the user for display on the display device It should be understood by those skilled in the art that the various embodiments and methods according to the present disclosure may be implemented in electronic hardware, computer software or combination of both. To clearly illustrate the interchangeability of hardware and software implementation, the specification of the present disclosure provides the generic description for each function of the block diagram and each step of the flow chart. Whether these functions and steps are implemented in hardware or software may depend on specific applications and design constraints. Those skilled in the art may implement the functions and steps described above differently without departing from the scope of the present disclosure.

The methods or algorithms according to the various embodiments of the present disclosure may be implemented in hardware, software executed by the processor or combination of both hardware and software. The software modules may be stored in RAM, system memory, ROM, EPROM, EEPROM, registers, hard drive, portable hard drive, CD-ROM, or any other storage media known to those skilled in the art. The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A simulated 3D image display method for a display device, comprising:

capturing at least two images of a scene for 3D scene reconstruction;

extracting depth and color information from the at least two images of the scene for 3D scene reconstruction;

continuously tracking movement of a user to determine a relative position between the user and the display device; and based on the relative position, reconstructing the image of the scene corresponding to a current viewpoint of the user from a plurality of view images of a plurality of viewpoints generated based on the at least two images and using an interpolation algorithm for display on a display screen of the display device, wherein the interpolation algorithm comprises:

when the user is tracked in a viewpoint having range of $0°<\theta<60°$, a corresponding display image is generated by using:

$Q+kD'=Q'$, and $k=1-\theta/60$;

wherein Q is the relative position of a pixel in a left image of the at least two images of the scene, Q' is the relative position of a same pixel in a reconstructed image corresponding to the viewpoint of the user, D' is a parallax value at the relative position Q in a parallax image produced from the left image and a right image of the at least two images of the scene;

when the user is tracked in the viewpoint having range of 60°≤θ<120°, the corresponding display image is generated by using:

$$-kD'_L p_1 + (1-k)D'_R p_2 = p', \text{ and } k=(\theta-90)/60;$$

wherein $p_1$ is a column coordinate of the pixel in the left image, $p_2$ is a column coordinate of the same pixel in the right image, p' is a column coordinate of the same pixel in the reconstructed image, corresponding row coordinates to $p_1$, $p_2$, and p' are the same, $D'_L$ is the parallax value in the parallax image produced with reference to the left image, $D'_R$ is the parallax value in the parallax image produced with reference to the right image; and when the user is tracked in the viewpoint having range of 120°≤θ<180°, the corresponding display image is generated by using:

$$F + kD' = F', \text{ and } k=(\theta-120)/60;$$

wherein F is the relative position of the pixel in the right image, F' is the relative position of the same pixel in the first image that is reconstructed and inserted to the right of the right image, D' is the parallax value at the relative position F in the parallax image produced from the left image and the right image.

2. The simulated 3D image display method of claim 1, wherein the at least two images for 3D scene reconstruction are images of a target object of the scene captured by a camera from different viewpoints.

3. The simulated 3D image display method of claim 1, wherein the at least two images for 3D scene reconstruction are images of a target object obtained from at least two I-frames of a video file capturing the target object.

4. The simulated 3D image display method of claim 1, wherein the depth and color information extracted from the at least two images of the scene for 3D scene reconstruction are represented in an RGBD format.

5. The simulated 3D image display method of claim 4, wherein parallax constraint and depth constraint are applied to at least two captured images of the scene where the depth and color information for 3D scene reconstruction are extracted.

6. The simulated 3D image display method of claim 2, before reconstructing the image of the scene corresponding to a current viewpoint of the user from a plurality of view images of a plurality of viewpoints, further including:
dividing a viewpoint range of the display device into N sections, wherein N is a number of images or I-frames of the scene, and each image or I-frame corresponds to one of the N sections.

7. The simulated 3D image display method of claim 6, further including:
matching the relative position between the user and the display device with one of the N sections.

8. The simulated 3D image display method of claim 7, further including:
generating N number of images of the scene corresponding to the N sections respectively based on the extracted depth and color information of the 3D scene; and
displaying on the display device the image of the scene corresponding to a section that matches the relative position.

9. The simulated 3D image display method of claim 1, wherein the relative position between the user and the display device further includes:

the relative position between the user and the display device when the user is a stationary state and the display device is in a moving state;
the relative position between the user and the display device when the user is a moving state and the display device is a stationary state; and
the relative position between the user and the display device when both the user and the display device are in a moving state.

10. A display device, comprising:
a camera configured to capture at least two images of a scene for 3D scene reconstruction;
a position detector configured to continuously track movement of a user to determine a relative position between the user and the display device;
a mass storage;
a processor coupled to the mass storage; and
a plurality of program units stored in the mass storage to be executed by the processor, wherein the processor is configured to:
extract depth and color information of the scene for 3D scene reconstruction based on the at least two images of the scene captured by the camera; and
based on the relative position determined by the position detector, reconstructing the image of the scene corresponding to a current viewpoint of the user from a plurality of view images of a plurality of viewpoints generated based on the at least two images and using an interpolation algorithm for display on a display screen of the display device,
wherein the interpolation algorithm comprises:
when the user is tracked in a viewpoint having range of 0°<θ<60°, a corresponding display image is generated by using:

$$Q + kD' = Q', \text{ and } k=1-\theta/60;$$

wherein Q is the relative position of a pixel in a left image of the at least two images of the scene, Q' is the relative position of a same pixel in a reconstructed image corresponding to the viewpoint of the user, D' is a parallax value at the relative position Q in a parallax image produced from the left image and a right image of the at least two images of the scene;
when the user is tracked in the viewpoint having range of 60°≤θ<120°, the corresponding display image is generated by using:

$$-kD'_L p_1 + (1-k)D'_R p_2 = p', \text{ and } k=(\theta-90)/60;$$

wherein $p_1$ is a column coordinate of the pixel in the left image, $p_2$ is a column coordinate of the same pixel in the right image, p' is a column coordinate of the same pixel in the reconstructed image, corresponding row coordinates to $p_1$, $p_2$, and p' are the same, $D'_L$ is the parallax value in the parallax image produced with reference to the left image, $D'_R$ is the parallax value in the parallax image produced with reference to the right image; and
when the user is tracked in the viewpoint having range of 120°≤θ<180°, the corresponding display image is generated by using:

$$F + kD' =, \text{ and } k=(\theta-120)/60;$$

wherein F is the relative position of the pixel in the right image, F' is the relative position of the same pixel in the first image that is reconstructed and inserted to the right of the right image, D' is the parallax value at the relative position F in the parallax image produced from the left image and the right image.

11. The display device of claim 10, wherein the at least two images of the scene captured by the camera are images of a target object of the scene captured by the camera from different viewpoints.

12. The display device of claim 10, wherein the camera obtains the at least two images for 3D scene reconstruction are images of a target object obtained from at least two I-frames of a video file capturing the target object.

13. The display device of claim 10, wherein the processor is further configured to:
represent the depth and color information extracted from the at least two images of the scene for 3D scene reconstruction in an RGBD format.

14. The display device of claim 13, wherein the processor is further configured to:
apply parallax constraint and depth constraint to the at least two captured images of the scene where the depth and color information for 3D scene reconstruction are extracted.

15. The display device of claim 11, wherein the processor is further configured to:
divide a viewpoint range of the display device into N sections, wherein N is a number of images or I-frames of the scene, and each image or I-frame corresponds to one of the N sections.

16. The display device of claim 15, wherein the processor is further configured to:
match the relative position between the user and the display device with one of the N sections.

17. The display device of claim 16, wherein the processor is further configured to:
generate N number of images of the scene corresponding to N sections respectively based on the extracted depth and color information of the scene; and
display on the display device the image of the scene corresponding to a section that matches the relative position.

18. The display device of claim 10, wherein the processor is further configured to:
generate the image of the scene corresponding to the relative position based on the relative position and at least two captured images of the scene.

19. The display device of claim 10, wherein the relative position between the user and the display device further includes:
the relative position between the user and the display device when the user is a stationary state and the display device is in a moving state;
the relative position between the user and the display device when the user is a moving state and the display device is a stationary state; and
the relative position between eth user and the display device when both the user and the display device are in a moving state.

* * * * *